(12) United States Patent
Stuttaford et al.

(10) Patent No.: US 7,677,025 B2
(45) Date of Patent: *Mar. 16, 2010

(54) SELF-PURGING PILOT FUEL INJECTION SYSTEM

(75) Inventors: Peter Stuttaford, Jupiter, FL (US); Stephen Jennings, Palm City, FL (US)

(73) Assignee: Power Systems Mfg., LLC, Jupiter, FL (US)

( * ) Notice: Subject to any disclaimer, the term of this patent is extended or adjusted under 35 U.S.C. 154(b) by 1026 days.

This patent is subject to a terminal disclaimer.

(21) Appl. No.: 10/906,057

(22) Filed: Feb. 1, 2005

(65) Prior Publication Data

US 2006/0168966 A1 Aug. 3, 2006

(51) Int. Cl.
*F02C 3/00* (2006.01)

(52) U.S. Cl. .................. 60/39.094; 60/737; 60/740; 60/748

(58) Field of Classification Search .............. 60/39.094, 60/399, 403, 737, 740, 742, 748
See application file for complete search history.

(56) References Cited

U.S. PATENT DOCUMENTS

| 5,799,872 | A | 9/1998 | Nesbitt et al. | |
|---|---|---|---|---|
| 5,983,642 | A * | 11/1999 | Parker et al. | 60/737 |
| 6,125,624 | A | 10/2000 | Prociw | |
| 6,675,583 | B2 | 1/2004 | Willis et al. | |
| 7,308,793 | B2 * | 12/2007 | Oumejjoud et al. | 60/748 |
| 2004/0168442 | A1 * | 9/2004 | Schmotolocha et al. | 60/776 |
| 2006/0150634 | A1 * | 7/2006 | Oumejjoud et al. | 60/776 |

* cited by examiner

*Primary Examiner*—Michael Cuff
*Assistant Examiner*—Phutthiwat Wongwian

(57) ABSTRACT

A gas turbine combustor having a self-purging pilot fuel injection system and method of operation thereof is disclosed. The pilot fuel injection system comprises a radial inflow swirler, a generally axially extending centerbody, and at least one fuel injection source. In operation a fluid containing at least air passes along the centerbody outer surface clearing any remaining fuel from proximate the fuel injection source so as to prevent flame attachment proximate the fuel injection source.

18 Claims, 3 Drawing Sheets

SELF-PURGING PILOT FUEL INJECTION SYSTEM

BACKGROUND OF THE INVENTION

The present invention is directed generally towards gas turbine combustors and more specifically towards an apparatus and method of providing a self-purging pilot fuel injection system.

A typical gas turbine engine comprises at least a compressor, a turbine, and at least one combustor. The compressor takes air from the surrounding atmosphere and compresses it by directing it through a plurality of stages of rotating and stationary airfoils, raising its pressure and temperature. This compressed air is then directed into a combustion system, which is most commonly annular or can-annular, and comprises a plurality of fuel injectors. Fuel, either gas or liquid, is mixed with the compressed air and ignited to form hot combustion gases. The hot combustion gases are then directed through a multi-stage turbine, which is coupled to the compressor, and for power generation, to an electrical generator.

The combustion system of the gas turbine engine typically has a number of operating points, depending on the power output required from the engine. The various operating points can generate different emissions levels, especially carbon monoxide (CO) and oxides of nitrogen (NOx). As a result, the combustion system will have different fuel injection points in order to maintain emissions levels within acceptable standards given the different power output requirements. Therefore, depending on the power output requirement, a higher emissions level operating point may be required.

A majority of combustion systems operate in one or both of two modes: diffusion and premix. Premix combustion systems offer lower emissions levels due to their ability to premix the fuel and air prior to igniting the mixture. On the contrary diffusion combustion systems operate where fuel and air mix along the flame front to produce a diffusion flame. That is, there is essentially no mixing prior to combustion. As a result, molecules of fuel remain unburned and result in higher level of emissions. However, some combustion systems utilize both modes of operation in that they employ a diffusion type mode during engine start-up, since a diffusion combustion system has a richer fuel content and results in greater starting reliability. Once these engines have started they transfer to a premix operation for extended periods of running so as to produce lower emissions.

An area of concern with any type of combustion system is the issue of flashback. Flashback occurs when pressures within the combustion system fluctuate such that a flame can travel upstream from the combustion zone into a premixing zone or fuel injection region. This is especially of concern for pilot fuel nozzles that historically have high fuel-air concentrations and that are fuel rich to support a pilot flame. Fuel injection adjacent to and in direct contact with the flame zone typically requires purging to ensure that when the fuel is shut-off the flame does not travel up a fuel line. Should there be a leak in a fuel line, hot gas can be drawn back up the fuel line and ignite, causing extreme damage and possible failure of the combustion hardware.

The present invention seeks to overcome the shortfalls of the prior art by providing an apparatus and method of self-purging a pilot fuel injection system that also provides an ignition source for a combustor.

SUMMARY OF THE INVENTION

The present invention discloses a pilot fuel injection system and method of operation thereof, that as a result of its geometry and fuel injection orientation is self-purging such that flame attachment along the fuel injection orifices is prevented under all operating conditions. The self-purging pilot fuel injection system comprises a radial inflow swirler, an end plate having a generally axially extending centerbody, and a plurality of first fuel injection orifices located along the centerbody. In operation, a fluid containing at least air passes through the radial inflow swirler, along the outer surface of the centerbody, and over the plurality of first fuel injection orifices so as to remove any remaining fuel particles proximate the first fuel injection orifices to prevent flame attachment proximate the first fuel injection orifices.

In an alternate embodiment, the self-purging pilot fuel injection system further comprises a plurality of second fuel injection orifices that are located proximate the radial inflow swirler and provide a second source of fuel injection. Fuel from the plurality of second fuel injection orifices mixes with the surrounding air and passes over the plurality of first fuel injection orifices so as to remove any remaining fuel particles proximate the first fuel injection orifices to prevent flame attachment proximate the first fuel injection orifices.

The self-purging pilot fuel injection system also provides a steady source of ignition for fuel entering a combustor. Once the self-purging pilot fuel is ignited by an ignition source, the pilot fuel injection system then serves as an igniter to ignite the additional fuel flow entering a combustor.

DETAILED DESCRIPTION OF THE PREFERRED EMBODIMENTS

Figure 1:
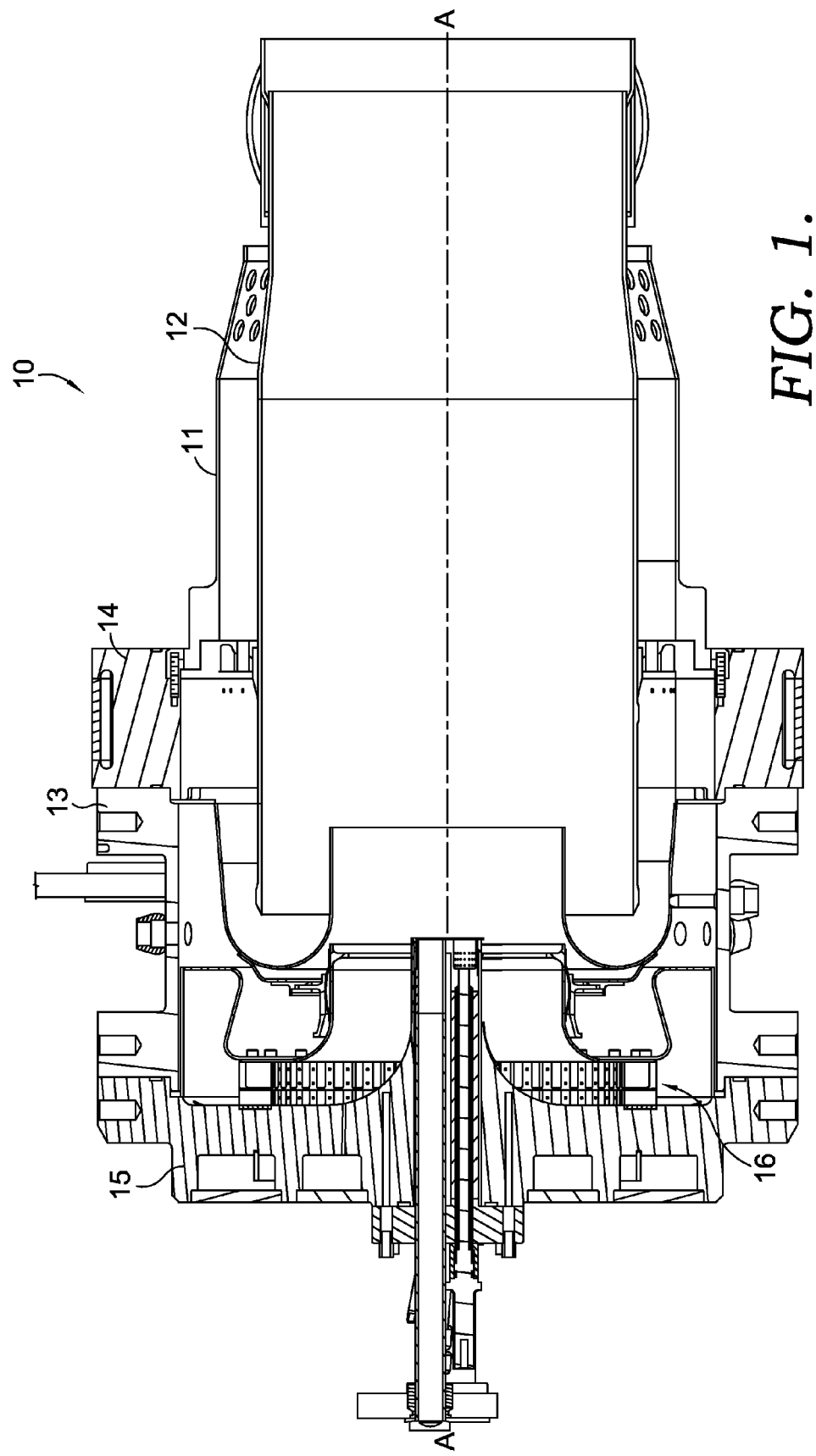
FIG. 1 is a cross section of a gas turbine combustor incorporating the present invention.

The preferred embodiment of the present invention will now be described with reference to FIGS. 1-4. A gas turbine combustor 10 incorporating the present invention is shown in cross section in FIG. 1. Combustor 10 comprises a number of components including a flow sleeve 11, combustion liner 12, case 13, main injector 14, end plate 15, and pilot fuel injection system 16. The focus of the present invention is on pilot fuel injection system 16 and its self-purging capability.

Figure 2:
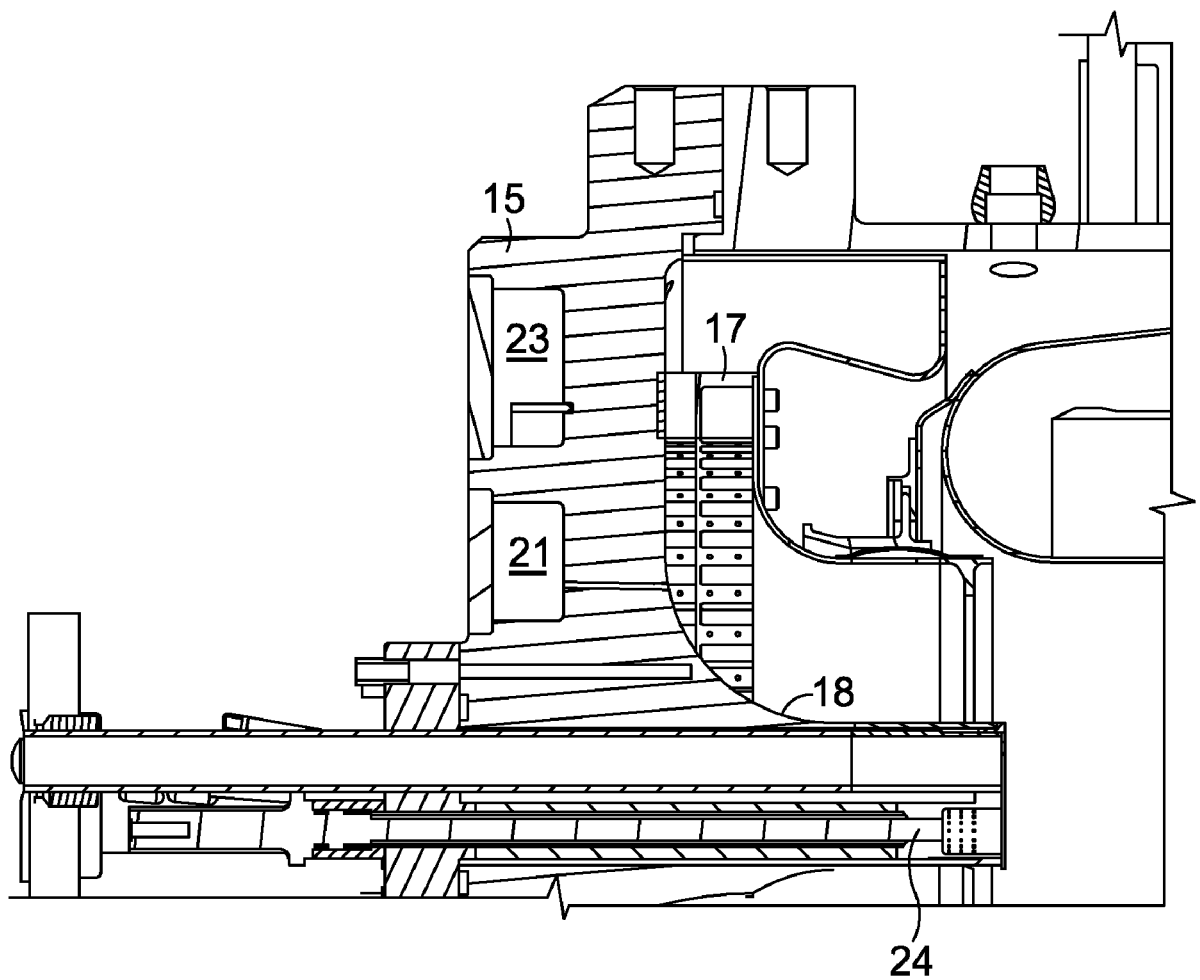
FIG. 2 is a detailed cross section view of a portion of the pilot injector in accordance with the present invention.
Figure 3:
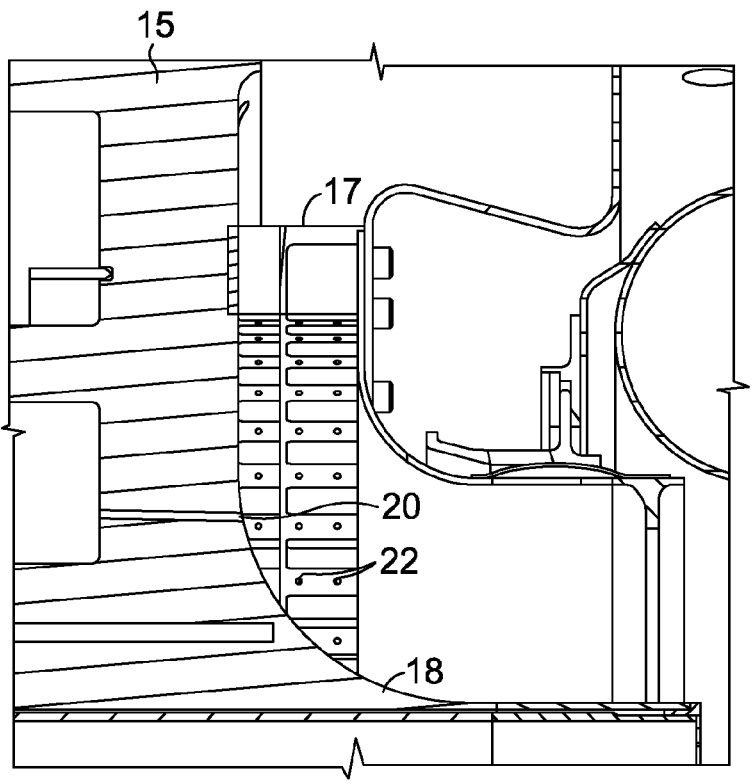
FIG. 3 is a further detailed cross section view of a portion of the pilot injector in accordance with the present invention.
Figure 4:
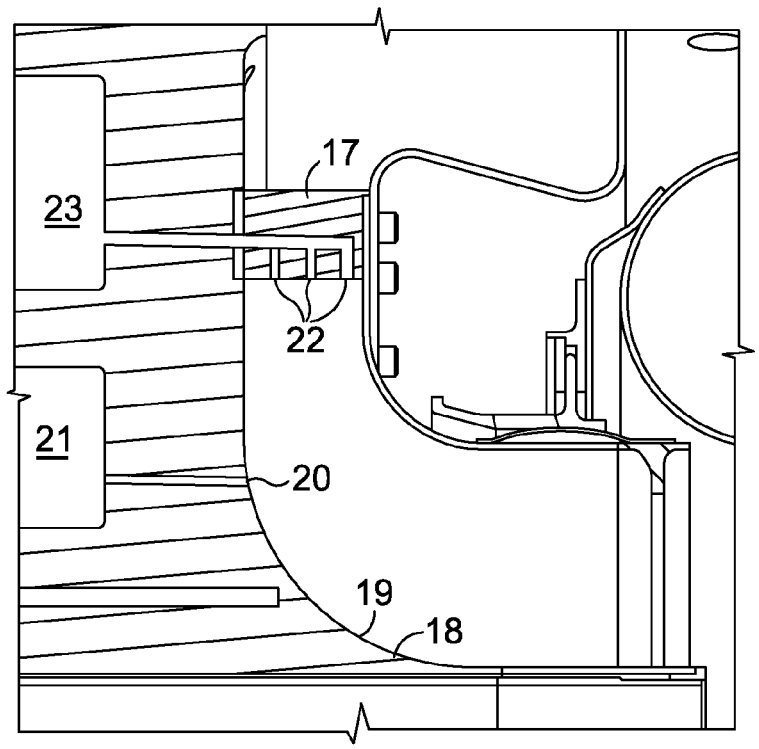
FIG. 4 is a further detailed cross section view of a portion of the pilot injector with some details removed for clarity in accordance with the present invention.

Referring now to FIGS. 2-4, further details of pilot fuel injection system 16 and its operation can be seen in greater detail. The pilot fuel injection system preferably comprises a radial inflow swirler 17 having at least one set of swirlers oriented generally perpendicular to a combustor centerline A-A (see FIG. 1). An additional feature of end plate 15 that is incorporated into pilot fuel injection system 16, and is shown in FIGS. 2-4, is an axially extending centerbody 18. This centerbody, which is preferably circular in shape, is located substantially along combustor centerline A-A and has an outer surface 19. The outer surface 19 tapers from generally parallel to combustor centerline A-A to generally perpendicular to combustor centerline A-A. Located along centerbody outer surface 19 is a plurality of first fuel injection orifices 20, which supply fuel from a first fuel supply 21 located in end plate 15 to a region immediately adjacent centerbody 18. Although the first fuel can be a variety of fuel types, it is preferred that for the present invention, a gaseous fuel, such as natural gas, is used. Furthermore, it is preferred, for fuel and air mixing benefits, that axially extending centerbody 18 extend axially downstream past plurality of first fuel injection orifices 20. With plurality of first fuel injection orifices 20 located generally parallel to combustor centerline A-A, the flow passing over these orifices is generally perpendicular and clears any excess fuel away from orifices 20 and first fuel supply 21 so as to prevent flame attachment proximate plurality of first fuel injection orifices 20. The passing flow essentially "cleans" outer surface 19 and orifices 20 of any remaining fuel. In one embodiment of the present invention, only air passes over plurality of first fuel injection orifices 20.

However, in an alternate embodiment of the present invention, a mixture of fuel and air passes over plurality of first injection orifices 20 so as to remove any remaining fuel particles proximate the first fuel injection orifices to prevent flame attachment proximate the first fuel injection orifices. The mixture is a formed from air passing through radial inflow swirler 17 and mixing with fuel from a plurality of second fuel injection orifices 22 located proximate swirler 17. In this alternate embodiment, plurality of second fuel injection orifices 22 are oriented generally perpendicular to plurality of first fuel injection orifices 20, as is shown in FIG. 4. Plurality of second fuel injection orifices are fed a fuel, typically gas, from a second fuel supply 23 in end plate 15. In this embodiment, it is preferred that both first fuel supply 21 and second fuel supply 23 are generally annular manifolds in end plate 15. As one skilled in the art of combustor fuel injection will understand, the use of generally annular manifolds provides for a simpler manufacturing process as well as generally uniform fuel flow to each fuel orifice.

In operation, the fuel and air entering combustion liner 12 serving as the pilot for engine start-up and lower load settings, enters the combustion liner generally along combustor centerline A-A from pilot fuel injection system 16. Additional fuel and air, for high load operations, enters combustion liner 12 from other regions such as flow sleeve 11 and main injector 14. In order to provide a self-purging pilot fuel injection system, a flow of fuel is directed through plurality of first fuel injection orifices 20 and generally along centerbody outer surface 19. The fuel is then ignited proximate centerbody 18 by an ignition source 24 that extends through centerbody 18. Ignition source 24 can be selected from a variety of ignitors, such as a spark igniter or a torch igniter. Once the fuel from pilot fuel injection system 16 is ignited, the self-purging fuel injector becomes an ignition source for fuel entering combustion liner 12 from main injector 14. Purging the pilot fuel injection system is accomplished by passing a fluid containing at least air along outer surface 19 and across plurality of first injection orifices 20. This is done such that the region proximate plurality of first fuel injection orifices 20 is constantly cleared of any residual fuel and as a result a flame cannot attach proximate plurality of first fuel injection orifices 20. An additional benefit of the disclosed pilot fuel injection geometry is realized with respect to fuel and air premixing prior to combustion. More specifically, utilizing a radial inflow swirler in combination with a generally axially extending centerbody, and the fuel injection orientation disclosed, not only provides the benefits already discussed, but also provides enhanced mixing by "sweeping" away the fuel being injected into the surrounding flow, just prior to turning the premixing flow approximately 90 degrees towards the combustor.

While the invention has been described in what is known as presently the preferred embodiment, it is to be understood that the invention is not to be limited to the disclosed embodiment but, on the contrary, is intended to cover various modifications and equivalent arrangements within the scope of the following claims.

What is claimed is:

1. A self-purging pilot fuel injection system, said injection system comprising:
    A radial inflow swirler, said swirler having at least one set of swirlers oriented generally perpendicular to a combustor centerline;
    An end plate having a generally axially extending centerbody, the axially extending centerbody located substantially along said combustor centerline and having an outer surface;
    A first fuel supply located in said end plate;
    A plurality of first fuel injection orifices that are operable to inject fuel parallel to the combustor centerline, the plurality of first fuel injection orifices located along the axially extending centerbody outer surface in a direction generally parallel to the combustor centerline, said first plurality of fuel injection orifices for supplying fuel from said first fuel supply to a region immediately adjacent said center body;
    A second fuel supply located in said end plate radially outward of said first fuel supply;
    A plurality of second fuel injection orifices that are operable to inject fuel perpendicular to the combustor centerline, the plurality of second fuel injection orifices located proximate said swirler and oriented generally perpendicular to the combustor centerline for supplying fuel from said second fuel supply to a stream of air passing through said swirler; and,
    Wherein a fluid containing at least air passes along said outer surface and over said plurality of first fuel injection orifices in a manner so as to prevent flame attachment proximate said plurality of first fuel injection orifices.

2. The self-purging pilot fuel injection system of claim 1 wherein the axially extending centerbody extends axially downstream past said plurality of first fuel injection orifices.

3. The self-purging pilot fuel injection system of claim 1 wherein the axially extending centerbody is generally circular in shape.

4. The self-purging pilot fuel injection system of claim 1 further comprising an ignition source extending through the axially extending centerbody.

5. The self-purging pilot fuel injection system of claim 4 wherein said ignition source is a torch igniter or a spark igniter.

6. The self-purging pilot fuel injection system of claim 1 wherein said first fuel supply and said second fuel supply are generally annular manifolds in said end plate about said combustor centerline.

7. The self-purging pilot fuel injection system of claim 1 wherein said first fuel supply is gas.

8. The self-purging pilot fuel injection system of claim 1 wherein said outer surface tapers from parallel to said combustor centerline to perpendicular to said combustor centerline.

9. The self-purging pilot fuel injection system of claim 1 wherein said fluid contains a mixture of fuel and air.

10. A self-purging pilot fuel injection system, said injection system comprising:
  A radial inflow swirler, said swirler having at least one set of swirlers oriented generally perpendicular to a combustor centerline;
  An end plate having a generally axially extending centerbody, the axially extending centerbody located substantially along said combustor centerline and having an outer surface;
  A first fuel supply located in said end plate;
  A plurality of first fuel injection orifices that are operable to inject fuel parallel to the combustor centerline, the plurality of first fuel injection orifices located along the axially extending centerbody outer surface for supplying fuel from said first fuel supply to a region immediately adjacent the axially extending centerbody, said first fuel injection orifices oriented generally parallel to the combustor centerline; and
  A plurality of second fuel injection orifices that are operable to inject fuel generally perpendicular to the combustor centerline, the plurality of second fuel injection orifices located proximate said swirler and oriented generally perpendicular to the combustor centerline; and
  Wherein a fluid containing at least air passes along said outer surface and over said plurality of first fuel injection orifices in a manner so as to prevent flame attachment proximate said plurality of first fuel injection orifices.

11. The self-purging pilot fuel injection system of claim 10 wherein said injection system further comprises a second fuel supply located in said end plate radially outward of said first fuel supply.

12. The self-purging pilot fuel injection system of claim 11 wherein said plurality of second fuel injection orifices for supplying fuel from said second fuel supply to a stream of air passing through said swirler.

13. The self-purging pilot fuel injection system of claim 10 wherein the axially extending centerbody extends axially downstream past said plurality of first fuel injection orifices.

14. The self-purging pilot fuel injection system of claim 13 wherein said outer surface tapers from parallel to said combustor centerline to perpendicular to said combustor centerline.

15. The self-purging pilot fuel injection system of claim 10 wherein the axially extending centerbody is generally circular in shape.

16. The self-purging pilot fuel injection system of claim 10 further comprising an ignition source extending through the axially extending centerbody.

17. The self-purging pilot fuel injection system of claim 16 wherein said ignition source is a torch igniter or a spark igniter.

18. A method of purging a pilot fuel injection system, said method comprising the steps:
  Providing a pilot fuel injection system for a gas turbine combustor comprising:
    (a) A radial inflow swirler, said swirler having at least one set of swirlers oriented generally perpendicular to a combustor centerline, wherein the combustor centerline is orientated axially in relation to a combustor liner of the gas turbine combustor;
    (b) An end plate having a generally axially extending centerbody, the axially extending centerbody located substantially along said combustor centerline and having an outer surface;
    (c) An ignition source;
    (d) A first fuel supply located in said end plate; and
    (e) A plurality of first fuel injection orifices that are operable to inject fuel parallel to the combustor centerline, the plurality of first fuel injection orifices located in the axially extending centerbody outer surface, in fluid communication with said first fuel supply, and oriented in a direction generally parallel to the combustor centerline;
  Directing a flow of fuel through said plurality of first fuel injection orifices and generally along the axially extending centerbody outer surface;
  Igniting said fuel at a region proximate to the axially extending centerbody; and
    Flowing a fluid containing at least air along said outer surface and generally perpendicular across said plurality of first fuel injection orifices such that a flame cannot attach proximate said plurality of first fuel injection orifices.

* * * * *